US008797140B2

(12) United States Patent
Shinzaki (10) Patent No.: US 8,797,140 B2
(45) Date of Patent: Aug. 5, 2014

(54) BIOMETRIC AUTHENTICATION METHOD AND BIOMETRIC AUTHENTICATION APPARATUS

(75) Inventor: Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1073 days.

(21) Appl. No.: 12/041,193

(22) Filed: Mar. 3, 2008

(65) Prior Publication Data

US 2008/0211627 A1    Sep. 4, 2008

(30) Foreign Application Priority Data

Mar. 2, 2007    (JP) ................................ 2007-053150

(51) Int. Cl.
| | |
|---|---|
| *H04Q 1/00* | (2006.01) |
| *H04Q 9/00* | (2006.01) |
| *G05B 19/00* | (2006.01) |
| *G06F 7/00* | (2006.01) |
| *H04B 3/00* | (2006.01) |
| *G06K 9/00* | (2006.01) |
| *G06F 21/32* | (2013.01) |
| *G06K 9/62* | (2006.01) |

(52) U.S. Cl.
CPC ............ *G06F 21/32* (2013.01); *G06K 9/00892* (2013.01); *G06K 9/6227* (2013.01)
USPC ....... 340/5.82; 340/5.52; 340/5.53; 340/5.83; 382/115

(58) Field of Classification Search
CPC ............................ G06F 21/32; G07C 9/00087
USPC .............. 340/5.82, 5.52, 5.53, 5.83; 382/116, 382/115
See application file for complete search history.

(56) References Cited

U.S. PATENT DOCUMENTS

| 5,229,764 A | * | 7/1993 | Matchett et al. ............. 340/5.52 |
| 6,292,830 B1 | * | 9/2001 | Taylor et al. .................. 709/224 |

(Continued)

FOREIGN PATENT DOCUMENTS

| EP | 1274047 A2 | 1/2003 |
| JP | 06-111006 A | 4/1994 |

(Continued)

OTHER PUBLICATIONS

JTC—Data—"Text of Working Draft 29794-4, Biometric Sample Quality—Part 4: Fingerprint Sample Quality Data" ISO/IEC JTC 1/SC 37 Biometrics, Feb. 2007.

(Continued)

*Primary Examiner* — Daniel Wu
*Assistant Examiner* — Mohamed Barakat
(74) *Attorney, Agent, or Firm* — Westerman, Hattori, Daniels & Adrian, LLP (57) ABSTRACT

According to an aspect of an embodiment, a method comprises, storing information corresponding to a plurality of users in association with first reference biometric data and second reference biometric data, the users being divided into first and second groups, the quality of the first reference biometric data of each of the users in the first group being not less than a predetermined level, the quality of the first reference biometric data of each of the users in the second group being less than the predetermined level, obtaining first biometric data of a user by inputting first biometric information of the user, providing first authentication, obtaining second biometric data of a user by inputting second biometric information of the user when the first authentication indicates presumed matching of the first biometric data with the first biometric reference data of one of the users in the second group and providing second authentication.

11 Claims, 9 Drawing Sheets

(56) References Cited

U.S. PATENT DOCUMENTS

| | | | |
|---|---|---|---|
| 6,757,408 B2* | 6/2004 | Houvener | 382/115 |
| 7,007,298 B1 | 2/2006 | Shinzaki et al. | |
| 7,088,220 B2* | 8/2006 | Kotzin | 340/5.82 |
| 7,184,579 B2* | 2/2007 | Mizoguchi | 382/124 |
| 7,245,745 B2* | 7/2007 | Nagasaka et al. | 382/115 |
| 7,362,884 B2* | 4/2008 | Willis et al. | 382/116 |
| 7,366,328 B2* | 4/2008 | Hamid et al. | 382/115 |
| 7,373,515 B2* | 5/2008 | Owen et al. | 713/182 |
| 7,606,396 B2* | 10/2009 | Miller et al. | 382/116 |
| 7,623,686 B2* | 11/2009 | Kondo et al. | 382/117 |
| 7,916,907 B2* | 3/2011 | Beatson et al. | 382/119 |
| 2001/0040988 A1* | 11/2001 | Takahashi | 382/124 |
| 2004/0006566 A1* | 1/2004 | Taylor et al. | 707/100 |
| 2004/0263315 A1* | 12/2004 | Kim et al. | 340/5.7 |
| 2006/0016868 A1* | 1/2006 | Bonalle et al. | 235/380 |
| 2006/0078177 A1* | 4/2006 | Niinuma et al. | 382/124 |
| 2006/0104485 A1 | 5/2006 | Miller, Jr. et al. | |
| 2006/0210119 A1 | 9/2006 | Willis et al. | |
| 2008/0240515 A1* | 10/2008 | Uno et al. | 382/115 |

FOREIGN PATENT DOCUMENTS

| | | |
|---|---|---|
| JP | 07-121712 A | 5/1995 |
| JP | 10-312462 A | 11/1998 |
| JP | 2000-259278 A | 9/2000 |
| JP | 2001-052165 A | 2/2001 |
| JP | 2002-163655 A | 6/2002 |
| JP | 2002-230553 A | 8/2002 |
| JP | 2003-044858 A | 2/2003 |
| JP | 2003-263640 A | 9/2003 |
| JP | 2003-303178 A | 10/2003 |
| JP | 2005-168627 A | 6/2005 |
| JP | 2005168627 A * | 6/2005 |
| JP | 2005-275508 A | 10/2005 |
| JP | 2006-031103 A | 2/2006 |
| JP | 2006-072553 A | 3/2006 |
| KR | 2006-0046619 A | 5/2006 |
| WO | WO 2004023384 A2 * | 3/2004 |

OTHER PUBLICATIONS

Ross et al.; "Multimodal Biometrics: An Overview"; Proc. of 12th European Signal Processing Conference (EUSIPCO), pp. 1221-1224, Sep. 2004, XP002560442 Vienna, Austria.

Jain et al.; "Learning User-Specific Parameters in a Multibiometric System" Proc. International Conference on Image Processing (ICIP), Sep. 22-25, 2002, XP002560443, Rochester, New York.

European Search Report Dated Jan. 4, 2010, issued in correspond European Patent Application No. 08101973.9.

Korean Office Action dated Feb. 18, 2010, issued in corresponding Korean Patent Application No. 10-2008-0018614.

Japanese Office Action dated Jan. 17, 2012, issued in corresponding Japanese Patent Application No. 2007-053150, with partial translation (p. 1, line 15-p. 2, line 17).

* cited by examiner

| Registrant number | Name | ... | Biometric information for the high-speed authentication method | Quality value | Biometric information for the high-compatibility-rate authentication method |
|---|---|---|---|---|---|
| A10100 | Taro Yamada | ... | xxxx | 10 | xxxx |
| A10101 | Hanako Suzuki | ... | xxxx | 8 | xxxx |
| A10102 | Junichi Abe | ... | xxxx | 9 | xxxx |
| ... | ... | ... | ... | ... | ... |

BIOMETRIC AUTHENTICATION METHOD AND BIOMETRIC AUTHENTICATION APPARATUS

BACKGROUND

1. Field

The present technique relates to a biometric authentication device, a biometric authentication program, and a multi biometrics authentication method for authenticating a user by using biometric information, and particularly to a biometric authentication device, a biometric authentication program, and a multi biometrics authentication method capable of achieving high-speed and high-compatibility-rate biometric authentication.

2. Description of the Related Art

Documents of the related art include Japanese Unexamined Patent Application Publication Nos. 2005-168627 and 2005-275508.

SUMMARY

According to an aspect of an embodiment, a biometric authentication method comprises, storing information corresponding to a plurality of users in association with first reference biometric data and second reference biometric data, the users being divided into first and second groups, the quality of the first reference biometric data of each of the users in the first group being not less than a predetermined level, the quality of the first reference biometric data of each of the users in the second group being less than the predetermined level, obtaining first biometric data of a user by inputting first biometric information of the user, providing first authentication by comparison of the first biometric data with the first reference biometric data, obtaining second biometric data of a user by inputting second biometric information of the user when the first authentication indicates presumed matching of the first biometric data with the first biometric reference data of one of the users in the second group and providing second authentication by comparison of the second biometric data with the second reference biometric data of the users in second group.

DESCRIPTION OF THE PREFERRED EMBODIMENTS

With reference to the accompanying drawings, preferred examples of a biometric authentication device, a biometric authentication program, and a multi biometrics (e.g. Multi-Biometrics) authentication method according to the present embodiment will be described below in detail.

A multi biometrics (e.g. Multi-Modal Biometrics) authentication method of performing authentication by combining a plurality of biometric authentication methods has been known. While the multi biometrics authentication method is capable of improving the accuracy of the authentication, the method has a disadvantage in that the time required for the authentication is long due to the need to perform the plurality of biometric authentication methods.

Further, some of the multi biometrics authentication methods do not take into account of incompatible users. For example, in the case of fingerprint authentication, which is a typical biometric authentication method, a few percent of the users subjected to the authentication become incompatible with the authentication due to such reasons as an abraded fingerprint.

Each of such multi biometrics authentication methods is based on the assumption that a user subjected to the authentication is compatible with all biometric authentication methods included in the multi biometrics authentication method. Therefore, if the user fails to be compatible with any one of the biometric authentication methods, the user cannot be authenticated.

First Example

Description will first be made of an outline of a multi biometrics authentication method according to the present example. In the multi biometrics authentication method according to the present example, the authentication is performed by the combination of a biometric authentication method capable of performing an authentication process at a high speed and a biometric authentication method compatible with a high proportion of people. The biometric authentication method capable of performing the authentication process at a high speed will be hereinafter referred to as the high-speed authentication method. Meanwhile, the biometric authentication method compatible with a high proportion of people will be referred to as the high-compatibility-rate authentication method.

The high-speed authentication method includes a fingerprint authentication method, for example. In the fingerprint authentication method, the authentication process can be performed at a high speed by converting the feature quantities of fingerprint information into numeric values and comparing the converted numeric values. However, the ratio of people incompatible with the fingerprint authentication method is relatively high due to such reasons as the abrasion of a fingerprint.

The high-compatibility-rate authentication method includes a vein authentication method, for example. In the vein authentication method, the shape of the vein located inside the palm of a hand is compared by pattern matching. Therefore, the authentication process requires time. However, most people are compatible with the vein authentication method. This is because the shape of the vein constitutes information of an internal part of a living body, which is unaffected by the abrasion or the like, unlike the fingerprint.

The multi biometrics authentication method according to the present example achieves high-speed and high-compatibility-rate biometric authentication by combining the high-speed authentication method and the high-compatibility-rate authentication method. To achieve the biometric authentication, in the multi biometrics authentication method according to the present example, the information of registrants subjected to matching is previously divided into two groups. The information of registrants subjected to matching will be hereinafter referred to as the registrant information.

The registrant information herein refers to information in which a variety of attribute information of the registrants, biometric information previously acquired from the registrants for the high-speed authentication method, and biometric information previously acquired from the registrants for the high-compatibility-rate authentication method are stored in association with one another.

The first group is a group of registrants whose biometric information previously acquired for the high-speed authentication method is high in quality, i.e., a group of registrants on whom the authentication can be sufficiently accurately performed even solely by the high-speed authentication method. Meanwhile, the second group is a group of registrants whose biometric information previously acquired for the high-speed authentication method is low in quality, i.e., a group of registrants who cannot be typically handled by the high-speed authentication method.

If the fingerprint authentication method is employed as the high-speed authentication method, the incompatibility rate of the fingerprint authentication method is a few percent. Therefore, a few percent of all registrants are included in the second group, and most of the registrants excluding the few percent are included in the first group.

In the authentication by the multi biometrics authentication method according to the present example, the biometric information for the high-speed authentication method is first acquired from a user, and the quality of the biometric information is determined. Then, if the biometric information is determined to be sufficiently high in quality, the authentication is performed on the first group by using the high-speed authentication method.

Meanwhile, if the biometric information acquired for the high-speed authentication method is determined not to be sufficiently high in quality, the biometric information for the high-compatibility-rate authentication method is acquired from the user. Then, the authentication is performed on the second group by using the high-compatibility-rate authentication method.

According to the present method, the users compatible with the high-speed authentication method are authenticated by the high-speed authentication method. Therefore, the users can be authenticated in a short time. Further, as for the users incompatible with high-speed authentication method, the authentication by the high-compatibility-rate authentication method is performed on the small number of previously grouped registrants. Therefore, the users can be authenticated in a sufficiently short time, even if the authentication by the high-compatibility-rate authentication method is low in speed.

Figure 1:
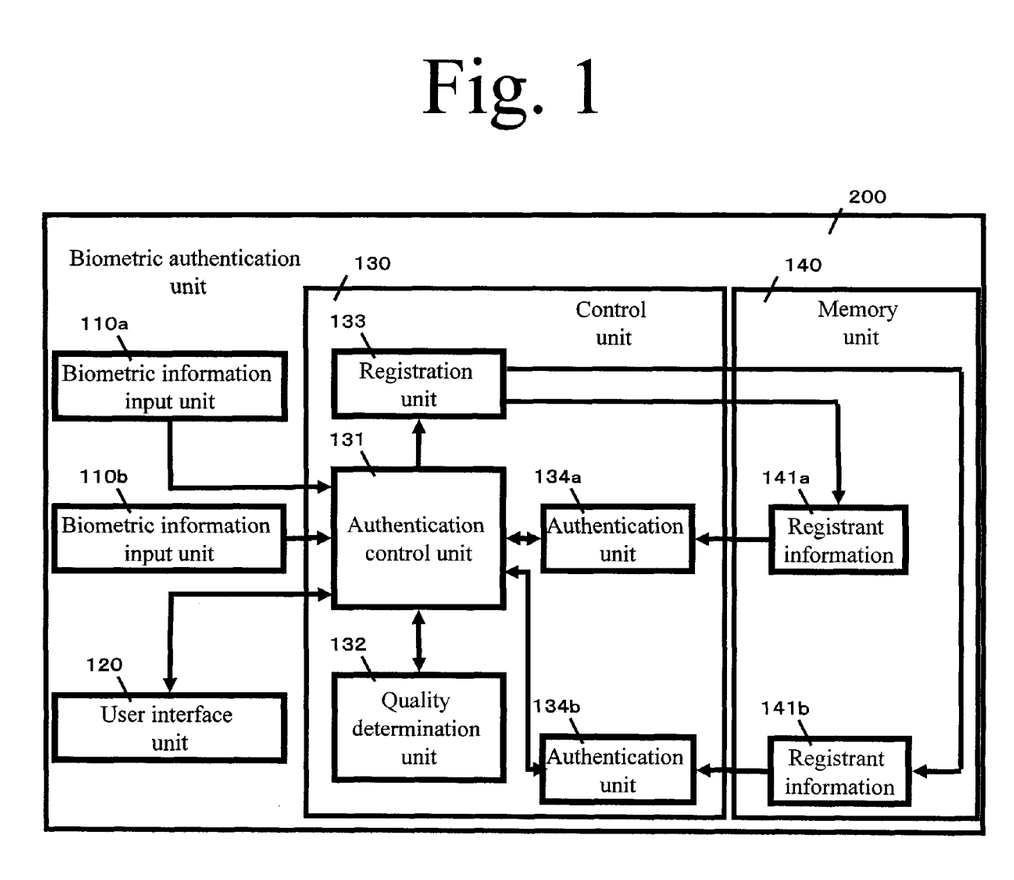
FIG. 1 is a functional block diagram illustrating a configuration of a biometric authentication device according to a first example.

Subsequently, description will be made of a configuration of a biometric authentication device 100 which performs the above-described multi biometrics authentication method according to the present example. FIG. 1 is a functional block diagram illustrating the configuration of the biometric authentication device 100 according to the present example. As illustrated in the figure, the biometric authentication device 100 includes a biometric information input unit 110a, a biometric information input unit 110b, a user interface unit 120, a control unit 130, and a memory unit 140.

The biometric information input unit 110a constitutes a processing unit for acquiring the biometric information for the high-speed authentication method. If the biometric authentication device 100 employs the fingerprint authentication method as the high-speed authentication method, for example, the biometric information input unit 110a corresponds to a fingerprint sensor.

The biometric information input unit 110b constitutes a processing unit for acquiring the biometric information for the high-compatibility-rate authentication method. If the biometric authentication device 100 employs the vein authentication method as the high-compatibility-rate authentication method, for example, the biometric information input unit 10b corresponds to a vein sensor.

The user interface unit 120 constitutes an interface unit for displaying a variety of messages to a user or an administrator of the biometric authentication device 100 and receiving inputs such as instructions from the user or the administrator. The user interface unit 120 includes a monitor, a keyboard, and so forth.

The control unit 130 constitutes a control unit for controlling the entirety of the biometric authentication device 100. The control unit 130 includes an authentication control unit 131, a quality determination unit 132, a registration unit 133, an authentication unit 134a, and an authentication unit 134b. The authentication control unit 131 constitutes a control unit for controlling the respective parts of the device to perform the multi biometrics authentication method according to the present example. A detailed control procedure by the authentication control unit 131 will be later described.

The quality determination unit 132 constitutes a processing unit for determining the quality of the biometric information for the high-speed authentication method acquired by the biometric information input unit 110a. The quality herein refers to whether or not the biometric information is suitable for the biometric authentication. The more suitable for the biometric authentication the biometric information is, the higher in quality the biometric information is determined to be.

For example, if the biometric authentication device 100 employs the fingerprint authentication method as the high-speed authentication method, the quality determination unit 132 measures, for example, the amount of noise and the per-pixel distribution of luminance in a fingerprint image acquired by the biometric information input unit 110a. Then, if the ridge of the fingerprint image is evaluated to be clear, the quality determination unit 132 determines the fingerprint image to be high in quality. The method of measuring the quality of the biometric information can be changed as required in accordance with the employed biometric authentication method.

The quality determination unit 132 outputs a quality value as the result of the evaluation of the biometric information. The quality value is represented by a numeric value, such as one of 10 to 1 arranged in the order of quality from the highest, for example. A specific example of the evaluation by the quality determination unit 132 will now be described with the fingerprint image taken as an example.

Users are divided into first and second groups. In the first group, a number of characteristic points of a finger print image are not less than a predetermined number. In the second group, a number of characteristic points of a finger print image are less than the predetermined number. And compared to contrast of the finger print image of the second group, contrast of the finger print image of the first group is high.

In particular, a method of determining a quality level of a finger print is as this. The finger print image is divided into a predetermined number area. A max value of a pixel value and a minimum value of a pixel value of the finger print image are obtained in each area. And a quality level is determined on the basis of the max and minimum value. A concentration distribution is obtained each area. Whether or not there are peak of black color and white color is judged in each area. And a quality level is determined on the basis of the judging.

Figure 8A:
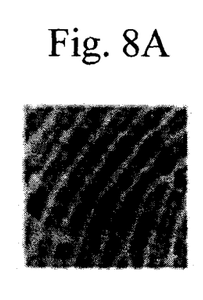
FIGS. 8A, 8B and 8C are diagrams illustrating examples of high-quality fingerprint images.
Figure 8B:
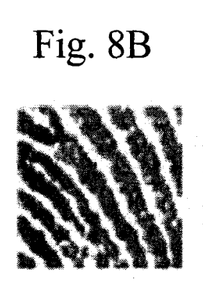
Figure 8C:
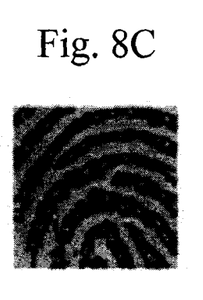
Figure 8D:
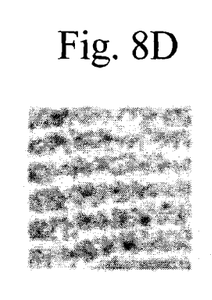
FIGS. 8D, 8E and 8F are diagrams illustrating examples of normal-quality fingerprint images.
Figure 8E:
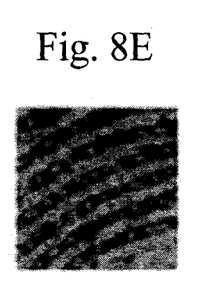
Figure 8F:
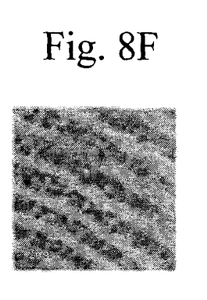
Figure 8G:
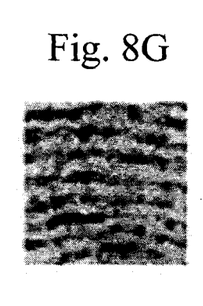
FIGS. 8G, 8H and 8I are diagrams illustrating examples of quality-deteriorated fingerprint images.
Figure 8H:
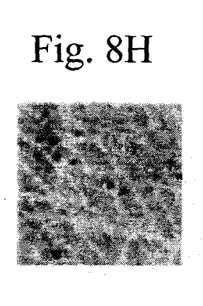
Figure 8I:
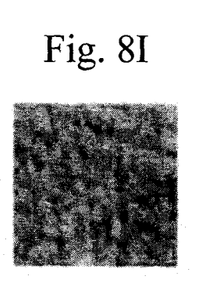
Figure 8J:
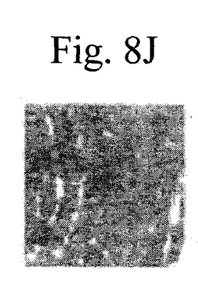
FIGS. 8J, 8K and 8L are diagrams illustrating examples of fingerprint images incompatible with biometric authentication.
Figure 8K:
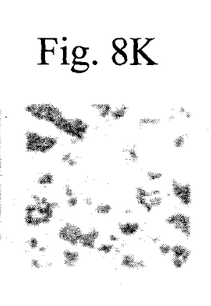
Figure 8L:
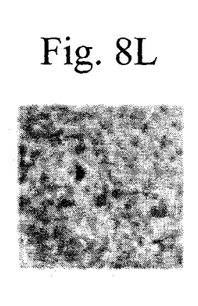

FIGS. 8A, 8B and 8C illustrate examples of high-quality fingerprint images. The quality values of the fingerprint images are determined to be 10 to 9, for example. FIGS. 8D, 8E and 8F illustrate examples of normal-quality fingerprint images. The quality values of the fingerprint images are determined to be 8 to 6, for example. FIGS. 8G, 8H and 8I illustrate examples of quality-deteriorated fingerprint images. The quality values of the fingerprint images are determined to be 5 to 3, for example. FIGS. 8J, 8K and 8L illustrate examples of fingerprint images incompatible with the biometric authentication. The quality values of the fingerprint images are determined to be 2 to 1, for example. And FIGS. 8A to 8L are quoted from "Text of Working Draft 29794-4, Biometric Sample Quality—Part 4: Fingerprint Sample Quality Data".

The registration unit 133 constitutes a processing unit for storing the registrant information in the memory unit 140. On the basis of the quality of the biometric information for the high-speed authentication method included in the registrant information, the registration unit 133 registers the registrant information by differentiating the registrants compatible with the high-speed authentication method from the registrants incompatible with the high-speed authentication method. Description will now be made of a registration procedure of the registrant information.

If the biometric authentication device 100 is requested to register new registrant information, the authentication control unit 131 first instructs the biometric information input unit 110a to acquire the biometric information for the high-speed authentication method. Then, the authentication control unit 131 instructs the biometric information input unit 10b to acquire the biometric information for the high-compatibility-rate authentication method. Further, the authentication control unit 131 instructs the user interface unit 120 to acquire the attribute information of a registrant, such as the name of the registrant.

Subsequently, the authentication control unit 131 instructs the quality determination unit 132 to determine the quality of the biometric information acquired by the biometric information input unit 110a. Then, the authentication control unit 131 transmits to the registration unit 133 the acquired biometric information and attribute information and the result of the determination made by the quality determination unit 132, and instructs the registration unit 133 to register the transmitted information as the registrant information.

Upon receipt of the instruction, the registration unit 133 compares a predetermined value with the quality value representing the result of the determination made by the quality determination unit 132. Then, if the result of the comparison indicates that the registrant is compatible with the high-speed authentication method, the registration unit 133 registers the transmitted information in registrant information 141a of the memory unit 140. Meanwhile, if the result of the determination made by the quality determination unit 132 indicates that the registrant is incompatible with the high-speed authentication method, the registration unit 133 registers the transmitted information in registrant information 141b of the memory unit 140.

The predetermined value herein refers to a reference value used to divide the registrant information into the group compatible with the high-speed authentication method and the group incompatible with the high-speed authentication method. An appropriate value is set as required as the predetermined value in accordance with the type of the high-speed authentication method, the accuracy of the determination made by the quality determination unit 132, and so forth.

Figure 2:
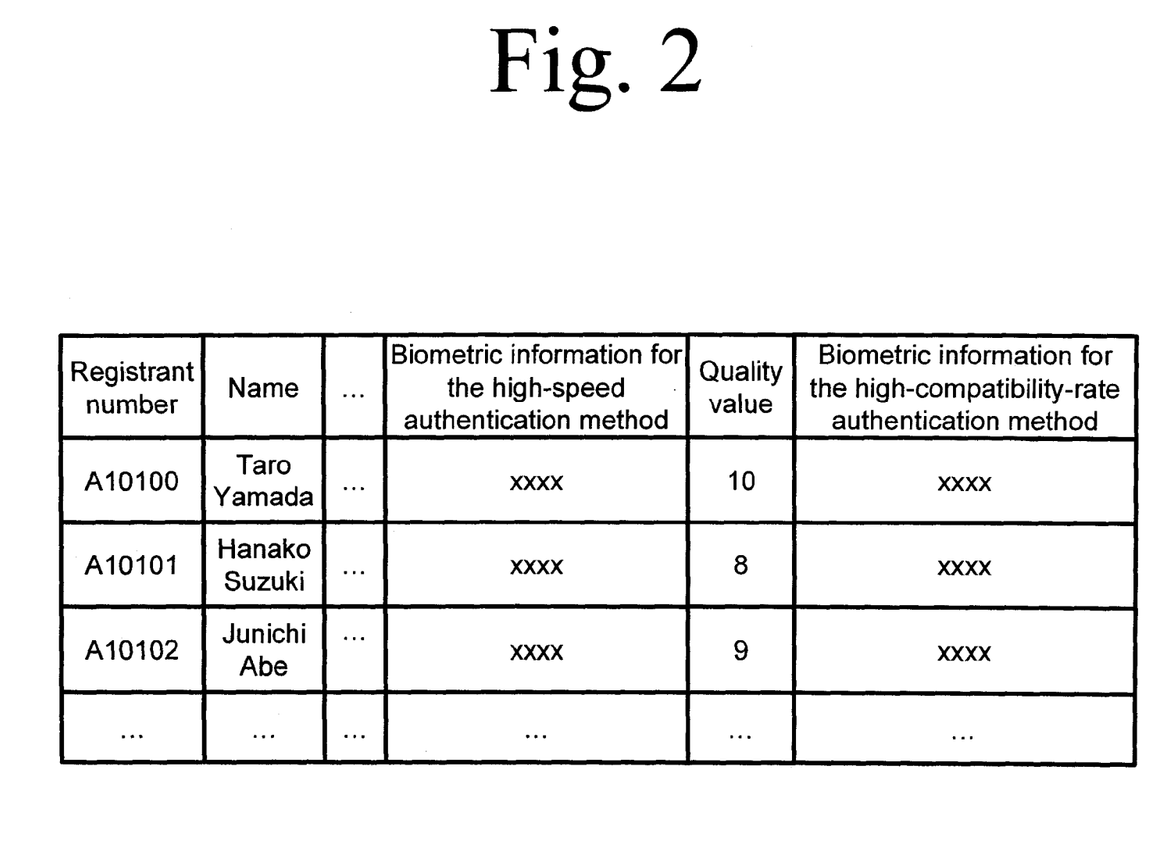
FIG. 2 is a diagram illustrating an example of a data configuration of registrant information.

The registrant information 141a is registrant information for storing high-quality information of the registrants compatible with the high-speed authentication method. As illustrated in FIG. 2, the registrant information 141a stores the attribute information of each registrant, such as the registrant number of the name of the registrant, the biometric information for the high-speed authentication method and the quality value of the biometric information, and the biometric information for the high-compatibility-rate authentication method, with the above sets of information associated with one another. The biometric information stored in the registrant information 141a is the exact biometric information acquired by the biometric information input unit 110a or 10b or the result of the extraction of the feature quantities. The registrant information 141b is registrant information for storing low-quality information of the registrants incompatible with the high-speed authentication method. The registrant information 141b has a similar data configuration to the data configuration of the registrant information 141a.

The registrant information 141a and the registrant information 141b do not necessarily need to be physically distinguished from each other, as long as the registrants compatible with the high-speed authentication method can be easily distinguished from the registrants incompatible with the high-speed authentication method. Further, there is no need to completely divide the registrant information into two groups, i.e., the registrants compatible with the high-speed authentication method and the registrants incompatible with the high-speed authentication method. Thus, borderline registrants may be overlapped, as in a case in which the registrants having the quality values of 10 to 2 are determined as the registrants compatible with the high-speed authentication method and the registrants having the quality values of 3 to 1 are determined as the registrants incompatible with the high-speed authentication method, for example.

Further, the registration unit 133 is not an essential component of the biometric authentication device 100. Thus, the registrant information registered in another device may be transmitted to the memory unit 140. Furthermore, the biometric authentication device 100 may access, via a network, the registrant information registered and stored in another device.

Referring back to the description of FIG. 1, the authentication unit 134a constitutes a processing unit for performing the biometric authentication by the high-speed authentication method. The authentication unit 134a performs the biometric authentication by comparing the biometric information acquired by the biometric information input unit 110a with the biometric information for the high-speed authentication of the respective registrants included in the registrant information 141a. In the identification of a registrant by the biometric authentication, one of the registrants whose matching rate of the biometric information is equal to or higher than a threshold value and is the highest matching rate may be authenticated as the registrant, with the emphasis placed on the accuracy. Alternatively, one of the registrants whose matching rate of the biometric information has first reached a threshold value may be authenticated as the registrant, with the emphasis placed on the high-speed operation. The matching rate is an example of the reference for evaluating the matching degree of the biometric information. Thus, another value may be used as the reference for evaluating the matching degree of the biometric information.

The authentication unit 134b constitutes a processing unit for performing the biometric authentication by the high-compatibility-rate authentication method. The authentication unit 134b performs the biometric authentication by comparing the biometric information acquired by the biometric information input unit 110b with the biometric information for the high-compatibility-rate authentication of the respective registrants included in the registrant information 141b or some of the registrants included in the registrant information 141a. In the identification of a registrant by the biometric authentication, one of the registrants whose matching rate of the biometric information is equal to or higher than a threshold value and is the highest matching rate may be, authenticated as the registrant, with the emphasis placed on the accuracy. Alternatively, one of the registrants whose matching rate of the biometric information has first reached a threshold value may be authenticated as the registrant, with the emphasis placed on the high-speed operation.

Figure 3:
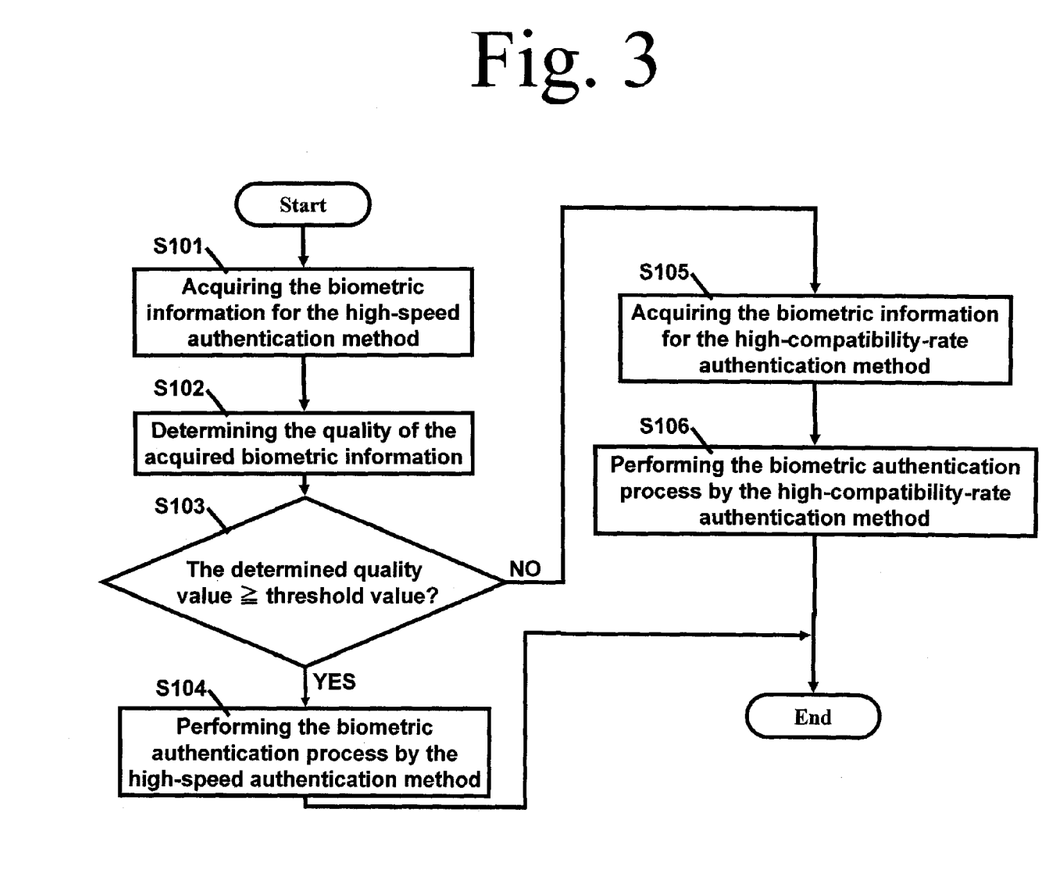
FIG. 3 is a flowchart illustrating a processing procedure performed by the biometric authentication device according to the first example.

Subsequently, description will be made of a processing procedure performed by the biometric authentication device 100 in the biometric authentication. FIG. 3 is a flowchart illustrating the processing procedure performed by the biometric authentication device 100. In the present processing procedure, the authentication control unit 131 first instructs the biometric information input unit 110a to acquire the biometric information for the high-speed authentication method (Step S101). Then, the authentication control unit 131 causes the quality determination unit 132 to determine the quality of the acquired biometric information (Step S102).

Then, the authentication control unit 131 compares a predetermined threshold value with the quality value obtained as the result of the determination made by the quality determination unit 132, to thereby determine whether or not the biometric information for the high-speed authentication method acquired at the Step S101 has a sufficient quality. The threshold value herein refers to a reference value used to determine whether or not the biometric information acquired in the authentication process has a sufficient quality suitable for the biometric authentication. The present threshold value may be a different value from the foregoing predetermined value. The foregoing predetermined value is the reference value used to determine the quality of the biometric information in the registration of the registrant information.

Then, if the determined quality value is equal to or higher than the threshold value, i.e., if a user is compatible with the high-speed authentication method (YES at Step S103), the authentication control unit 131 instructs the authentication unit 134a to perform the biometric authentication process by the high-speed authentication method on the registrant information 141a (Step S104).

Meanwhile, if the determined quality value is less than the threshold value, i.e., if the user is incompatible with the high-speed authentication method (NO at Step S103), the authentication control unit 131 instructs the biometric information input unit 110b to acquire the biometric information for the high-compatibility-rate authentication method (Step S105). Then, the authentication control unit 131 instructs the authentication unit 134b to perform the biometric authentication process by the high-compatibility-rate authentication method on the registrant information 141b (Step S106). So the high-compatibility-rate authentication method is performed when the high-speed authentication method indicates presumed matching of the first biometric data with the first biometric reference data of one of the users in the second group.

In step S104, the high-speed authentication method authenticates a user, the user having a maximum matching ratio in the high-speed authentication method, the matching ratio being not less than a predetermined ratio.

In step S106, the high-compatibility-rate authentication method authenticates a user in the high-compatibility-rate authentication method, the user having a maximum matching ratio, the matching ratio being not less than a predetermined ratio.

In the present processing procedure, the users compatible with the high-speed authentication method are authenticated by the high-speed authentication method. Therefore, the users can be authenticated in a short time. Meanwhile, as for the users incompatible with the high-speed authentication method, the authentication by the high-compatibility-rate authentication method is performed on the small number of previously grouped registrants. Therefore, the users can be authenticated in a sufficiently short time, even if the authentication by the high-compatibility-rate authentication method is low in speed.

The respective threshold values mentioned in the above description of the processing procedure can be changed as required in accordance with the accuracy, the processing speed, and so forth required for the authentication process.

Further, in the above-described processing procedure, in accordance with the result of the evaluation of the quality of the biometric information made by the quality determination unit 132, the threshold values used in the subsequent authentication processes may be dynamically changed. For example, if the quality of the acquired biometric information for the high-speed authentication is determined to be high by the quality determination unit 132, the threshold value of the matching rate for identifying a registrant may be increased so as to perform highly accurate authentication. Meanwhile, if the quality of the acquired biometric information for the high-speed authentication method is determined to be low by the quality determination unit 132, the threshold value of the matching rate for identifying a registrant may be decreased so as to increase the recognition rate.

Meanwhile, the configuration of the biometric authentication device 100 according to the present example illustrated in FIG. 1 can be changed in various ways within a scope not deviating from the gist of the present embodiment. For example, if the functions of the control unit 130 of the biometric authentication device 100 are implemented as software and executed on a computer, functions equal to the functions of the biometric authentication device 100 can be realized. Description will be made below of an example of the computer for executing a biometric authentication program 1081 which implements the functions of the control unit 130 as software.

Figure 4:
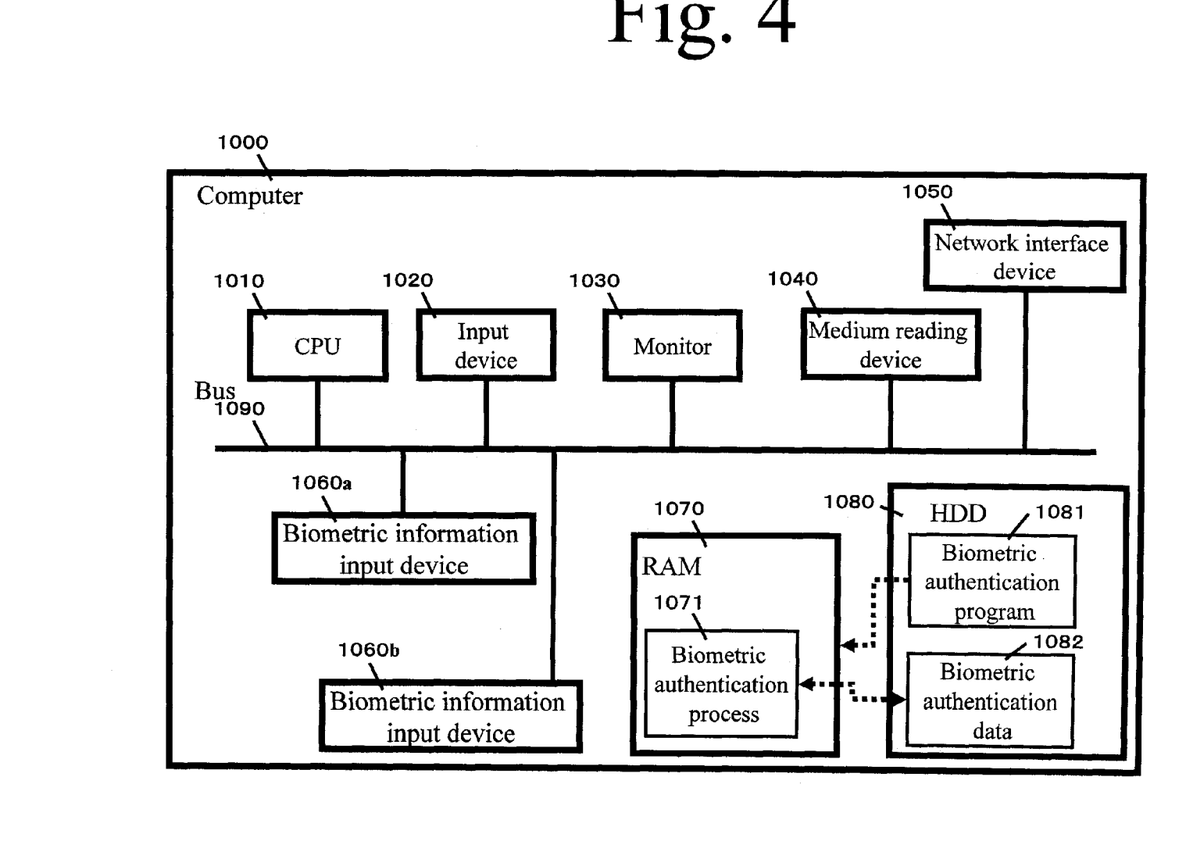
FIG. 4 is a functional block diagram illustrating a computer which executes a biometric authentication program.

FIG. 4 is a functional block diagram illustrating a computer 1000 for executing the biometric authentication program 1081. The computer 1000 includes a CPU (Central Processing Unit) 1010, an input device 1020, a monitor 1030, a medium reading device 1040, a network interface device 1050, a biometric information input device 1060a, a biometric information input device 1060b, a RAM (Random Access Memory) 1070, and a hard disk device 1080, which are connected by a bus 1090. The CPU 1010 performs a variety of arithmetic processes. The input device 1020 receives inputs of data from a user. The monitor 1030 displays a variety of information. The medium reading device 1040 reads a program and so forth from a recording medium. The network interface device 1050 exchanges data with another computer via a network. The biometric information input device 1060a acquires the biometric information for the high-speed authentication method. The biometric information input device 1060b acquires the biometric information for the high-compatibility-rate authentication method. The RAM 1070 temporarily stores a variety of information.

Further, the hard disk device 1080 stores the biometric authentication program 1081 having similar functions as the functions of the control unit 130 illustrated in FIG. 1, and biometric authentication data 1082 corresponding to a variety of data stored in the memory unit 140 illustrated in FIG. 1. The biometric authentication data 1082 may be dispersed as required, and may be stored in another computer connected to the computer 1000 via a network.

Further, the CPU 1010 reads the biometric authentication program 1081 from the hard disk device 1080 and develops the program in the RAM 1070. Thereby, the biometric authentication program 1081 functions as a biometric authentication process 1071. Then, the biometric authentication process 1071 develops the information and so forth read from the biometric authentication data 1082 in a region assigned as required on the RAM 1070, to thereby perform a variety of data processing on the basis of the thus developed data and so forth.

The above-described biometric authentication program 1081 does not necessarily need to be stored in the hard disk device 1080. For example, the program stored in a recording medium such as a CD-ROM (Compact Disc-Read Only Memory) may be read and executed by the computer 1000. Alternatively, the program may be stored in another computer (or a server) or the like connected to the computer 1000 via a public network, the Internet, a LAN (Local Area Network), a WAN (Wide Area Network), or the like, and may be read therefrom and executed by the computer 1000.

As described above, in the present first example, the registrant information of the registrants incompatible with the high-speed authentication method is stored so as to be distinguishable from the registrant information of the other registrants. Then, in the authentication of a registrant, the quality of the acquired biometric information for the high-speed authentication is evaluated. If the registrant is determined to be incompatible with the high-speed authentication method, the authentication by the high-compatibility-rate authentication method is performed only on the registrant information of the registrants incompatible with the high-speed authentication method. Accordingly, high-speed and high-compatibility-rate multi biometrics authentication can be achieved.

Second Example

In the first example, the description has been made of the example in which the registrant information is divided into two groups on the basis of the quality of the previously acquired biometric authentication information for the high-speed authentication method. In the present second example, description will be made of an example in which the registrant information is further divided to improve the authentication accuracy.

Figure 5:
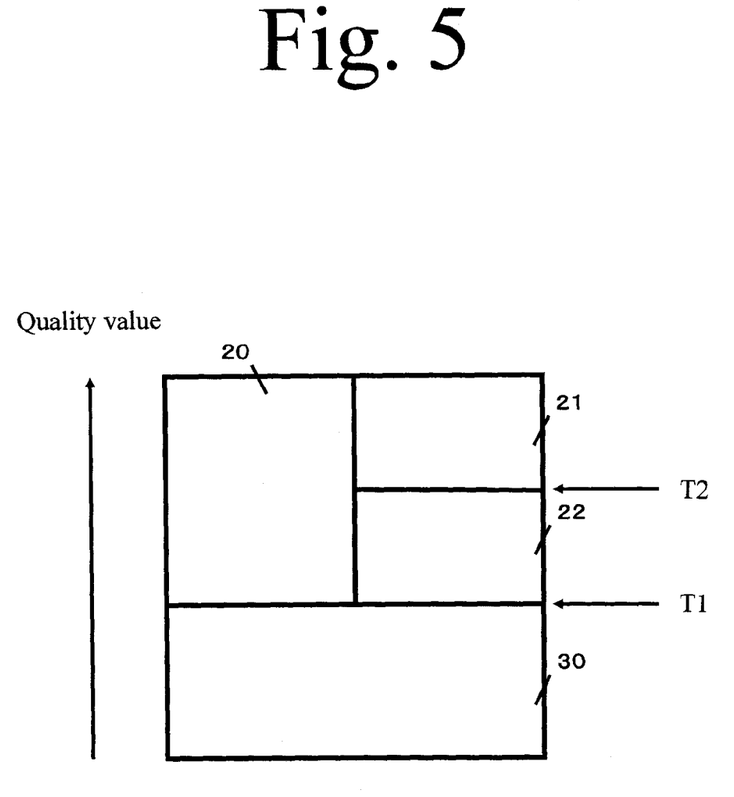
FIG. 5 is a diagram for explaining the classification of the registrant information in a second example.

FIG. 5 is a diagram for explaining the classification of the registrant information in the present example. As illustrated in the figure, in the present example, the registrant information is first divided into a group 20 and a group 30. In the group 20, the previously acquired biometric authentication information for the high-speed authentication method has a quality value equal to or higher than a first predetermined value T1. Meanwhile, in the group 30, the acquired authentication information has a quality value lower than the first predetermined value T1. The previously acquired biometric authentication information for the high-speed authentication method is herein referred to as the acquired authentication information.

The first predetermined value T1 herein refers to a reference value used to determine whether or not the acquired authentication information is sufficient in quality to be applied to the authentication by the high-speed authentication method. Therefore, the registrants corresponding to the registrant information classified in the group 20 can be regarded as the registrants to whom the authentication by the high-speed authentication method can be applied. Meanwhile, the registrants corresponding to the registrant information classified in the group 30 can be regarded as the registrants to whom the authentication by the high-speed authentication method cannot be applied.

Further, the registrant information classified in the group 20 is further divided into a group 21 and a group 22. In the group 21, the acquired authentication information has a quality value equal to or higher than a second predetermined value T2. Meanwhile, in the group 22, the acquired authentication information has a quality value lower than the second predetermined value T2.

The second predetermined value T2 herein refers to a reference value used to determine whether or not the quality of the acquired authentication information is at a level at which the authentication can be sufficiently accurately performed by the authentication solely by the high-speed authentication method. Therefore, the registrants corresponding to the registrant information classified in the group 21 can be regarded as the registrants who can be sufficiently accurately authenticated by the authentication solely by the high-speed authentication method. Meanwhile, the registrants corresponding to the registrant information classified in the group 22 can be regarded as the registrants to whom the authentication by the high-speed authentication method can be applied, but for whom sufficient authentication accuracy cannot be obtained from the authentication solely by the high-speed authentication method.

In the multi biometrics authentication method according to the present example, the authentication accuracy is improved by performing in combination the authentication by the high-speed authentication method and the authentication by the high-compatibility-rate authentication method on the registrants corresponding to the group 22.

Figure 6:
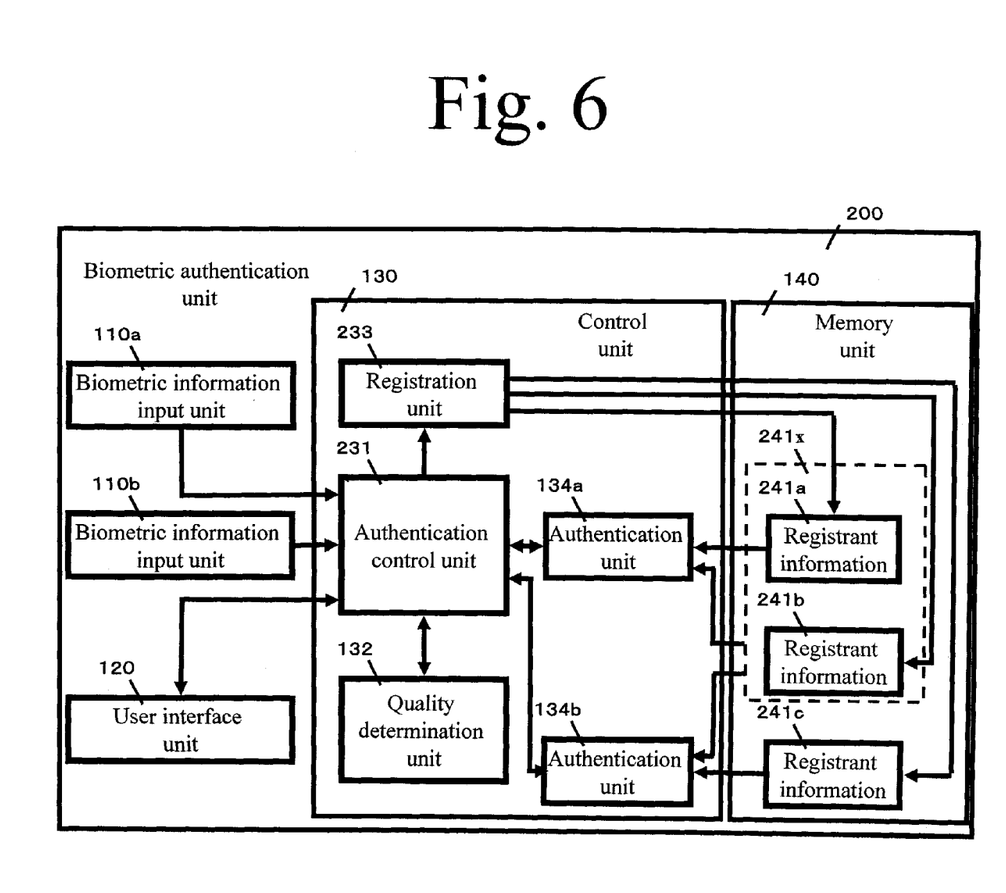
FIG. 6 is a functional block diagram illustrating a configuration of a biometric authentication device according to the second example.

Subsequently, description will be made of a configuration of a biometric authentication device 200 which performs the multi biometrics authentication method according to the present example. FIG. 6 is a functional block diagram illustrating the configuration of the biometric authentication device 200 according to the present example. As illustrated in the figure, the biometric authentication device 200 has a similar configuration as the configuration of the biometric authentication device 100 illustrated in FIG. 1, except that the authentication control unit 131 and the registration unit 133 are replaced by an authentication control unit 231 and a registration unit 233, and that the registrant information stored in the memory unit 140 is divided into three groups, i.e., registrant information 241a, registrant information 241b, and registrant information 241c. Thus, description will be herein limited to the differences from the biometric authentication device 100.

The authentication control unit 231 constitutes a control unit for controlling the respective parts of the device to perform the multi biometrics authentication method according to the present example. A detailed control procedure performed by the authentication control unit 231 will be later described.

The registration unit 233 constitutes a processing unit for storing the registrant information in the memory unit 140. On the basis of the quality of the biometric information for the high-speed authentication method included in the registrant information, the registration unit 233 registers the registrant information by dividing the registrant information into three groups, as illustrated in FIG. 5. Description will now be made of a registration procedure of the registrant information.

If the biometric authentication device 200 is requested to register new registrant information, the authentication control unit 231 first instructs the biometric information input unit 110a to acquire the biometric information for the high-speed authentication method. Then, the authentication control unit 231 instructs the biometric information input unit 110b to acquire the biometric information for the high-compatibility-rate authentication method. Further, the authentication control unit 231 instructs the user interface unit 120 to acquire the attribute information of a registrant, such as the name of the registrant.

Subsequently, the authentication control unit 231 instructs the quality determination unit 132 to determine the quality of the biometric information acquired by the biometric information input unit 110a. Then, the authentication control unit 231 transmits to the registration unit 233 the acquired biometric information and attribute information and the result of the determination made by the quality determination unit 132, and instructs the registration unit 233 to register the transmitted information as the registrant information.

Upon receipt of the instruction, the registration unit 233 compares the first predetermined value T1 with the quality value representing the result of the determination made by the quality determination unit 132. If the quality value is less than the first predetermined value T1, i.e., if the authentication by the high-speed authentication method cannot be applied to the registrant, the registration unit 233 registers the transmitted information in the registrant information 241c of the memory unit 140.

Further, if the quality value is equal to or higher than the first predetermined value T1 and is equal to or higher than the second predetermined value T2, i.e., if the registrant can be sufficiently accurately authenticated solely by the authentication by the high-speed authentication method, the registration unit 233 registers the transmitted information in the registrant information 241a of the memory unit 140. Furthermore, if the quality value is equal to or higher than the first predetermined value T1 but is less than the second predetermined value T2, i.e., if the authentication by the high-speed authentication method can be applied to the registrant but sufficiently accurate authentication cannot be performed solely by the authentication by the high-speed authentication method, the registration unit 233 registers the transmitted information in the registrant information 241b of the memory unit 140.

The registrant information 241a is registrant information for storing high-quality information of the registrants who can be sufficiently accurately authenticated solely by the high-speed authentication method. The registrant information 241a corresponds to the group 21 of FIG. 5. The registrant information 241b is registrant information for storing medium-quality information of the registrants to whom the authentication by the high-speed authentication method can be applied, but for whom sufficiently accurate authentication cannot be performed solely by the authentication by the high-speed authentication method. The registrant information 241b corresponds to the group 22 of FIG. 5. The registrant information 241c is registrant information for storing low-quality information of the registrants to whom the authentication by the high-speed authentication method cannot be applied. The registrant information 241c corresponds to the group 30 of FIG. 5.

Further, the registrant information 241a and the registrant information 241b are configured to be accessible as registrant information 241x, which is registrant information integrating the two sets of information. The registrant information 241x corresponds to the group 20 of FIG. 5.

The sets of registrant information 241a to 241c do not necessarily need to be physically distinguished from one another, as long as which one of the three groups illustrated in FIG. 5 includes a registrant can be easily determined, for example. Further, the registrant information does not need to be completely divided into the respective groups. Thus, borderline registrants may be overlapped, as in a case in which the groups 21, 22, and 30 include the registrants having the quality values of 10 to 7, the registrants having the quality values of 7 to 3, and the registrants having the quality values of 3 to 1, respectively, for example.

Further, the registration unit 233 is not an essential component of the biometric authentication device 200. Thus, the registrant information registered in another device may be transmitted to the memory unit 140. Furthermore, the biometric authentication device 200 may access, via a network, the registrant information registered and stored in another device.

Figure 7A:
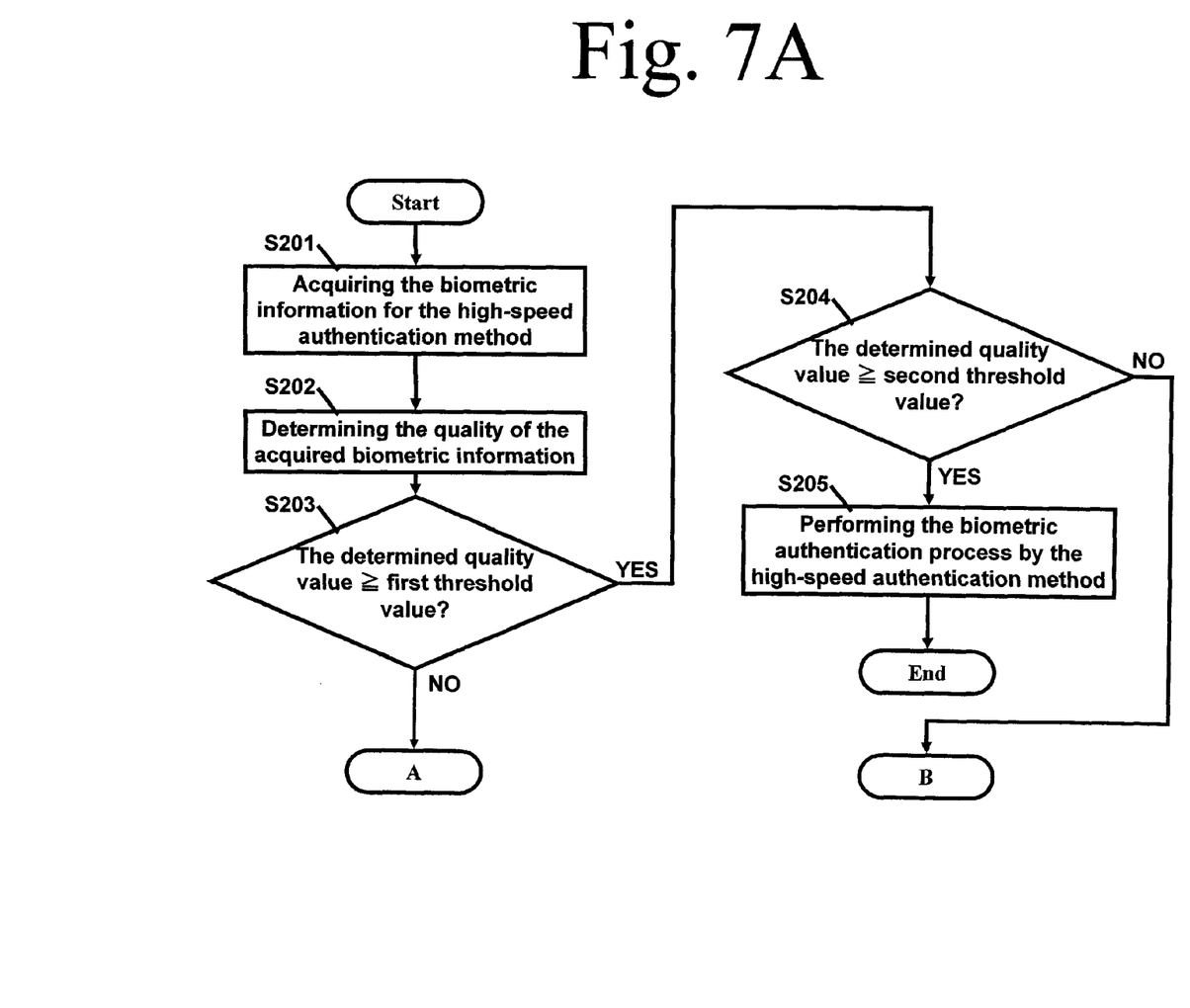
FIGS. 7A and 7B are flowcharts illustrating a processing procedure performed by the biometric authentication device according to the second example.
Figure 7B:
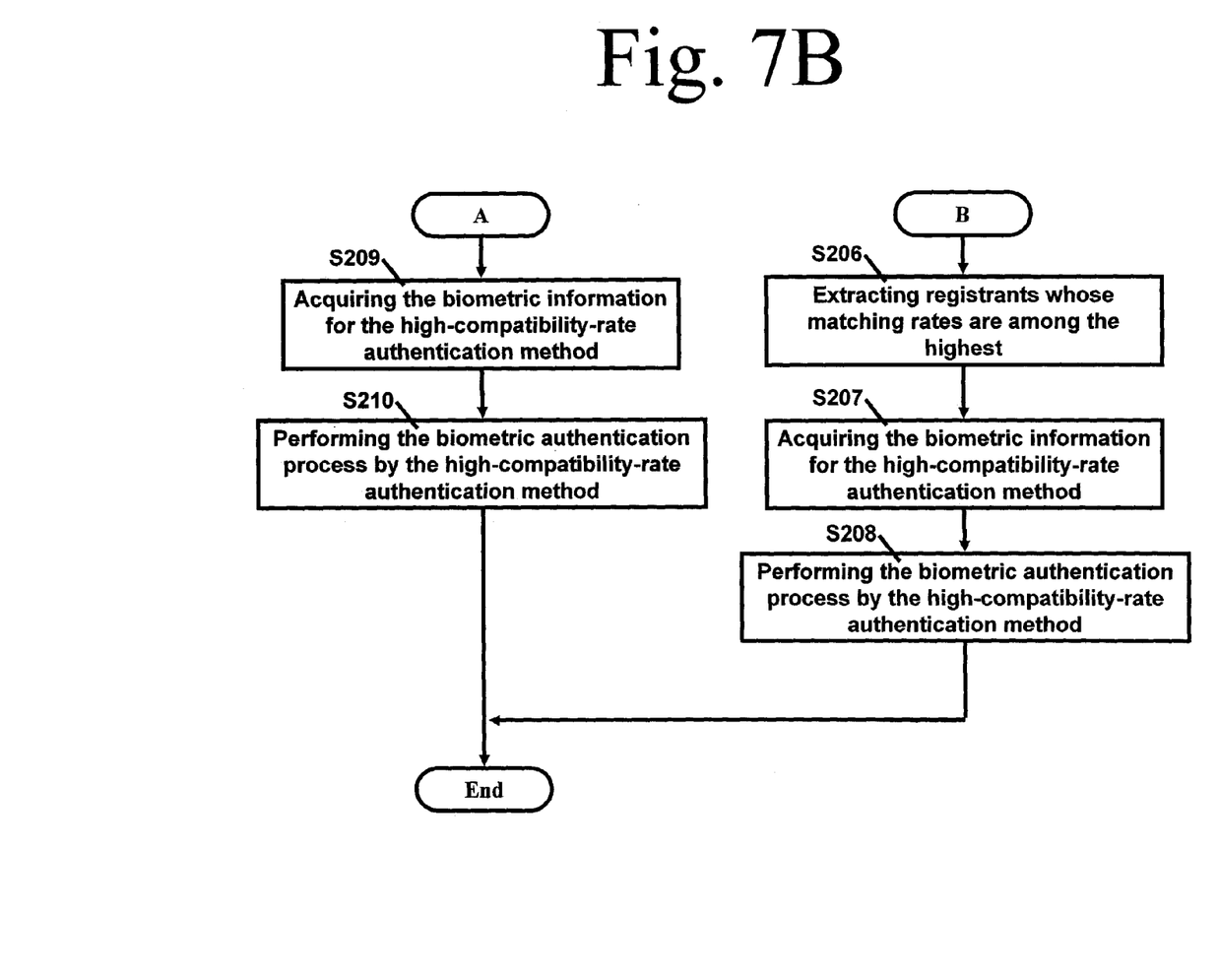

Subsequently, description will be made of a processing procedure performed by the biometric authentication device 200 in the biometric authentication. FIGS. 7A and 7B are flowcharts illustrating the processing procedure performed by the biometric authentication device 200. In the present processing procedure, the authentication control unit 231 first instructs the biometric information input unit 110a to acquire the biometric information for the high-speed authentication method (Step S201). Then, the authentication control unit 231 causes the quality determination unit 132 to determine the quality of the acquired biometric information (Step S202).

Then, if the determined quality value is equal to or higher than a first threshold value and is equal to or higher than a second threshold value (YES at Step S203 and YES at Step S204), the authentication control unit 231 instructs the authentication unit 134a to perform the biometric authentication process by the high-speed authentication method on the registrant information having a quality value equal to or higher than the second predetermined value T2, i.e., the registrant information 241a (Step S205).

The first threshold value and the second threshold value herein refer to a reference value corresponding to the first predetermined value T1 and a reference value corresponding to the second predetermined value T2, respectively. Therefore, if the determined quality value of a user is equal to or higher than the first threshold value and is equal to or higher than the second threshold value, it is indicated that the authentication by the high-speed authentication method can be applied to the user, and that sufficient authentication accuracy can be obtained solely from the authentication by the high-speed authentication method. Taking into account of variations in the quality value caused by differences in a variety of conditions for reading the biometric information, each of the first and second threshold values may be set as a value having a certain range.

Meanwhile, if the determined quality value is equal to or higher than the first threshold value and is less than the second threshold value, i.e., if the user is compatible with the high-speed authentication method but cannot be sufficiently accurately authenticated solely by the high-speed authentication method (YES at Step S203 and NO at Step S204), the authentication control unit 231 instructs the authentication unit 134a to perform the biometric authentication process by the high-speed authentication method on the registrant information having a quality value equal to or higher than the first predetermined value T1, i.e., the registrant information 241x including the registrant information 241a and the registrant information 241b to thereby extract registrants whose matching rates are among the highest (Step S206).

Then, the authentication control unit 231 instructs the biometric information input unit 110b to acquire the biometric information for the high-compatibility-rate authentication method (Step S207). Then, the authentication control unit 231 instructs the authentication unit 134b to perform the biometric authentication process by the high-compatibility-rate authentication method on the information corresponding to the registrants extracted from the registrant information 241x at the Step S206 (Step S208).

In the above-described processing procedure, the biometric authentication process by the high-speed authentication method is performed on the registrant information 241x including the registrant information 241a and the registrant information 241b, and the registrants whose matching rates are among the highest are extracted. Thereafter, the biometric authentication process by the high-compatibility-rate authentication method is performed. Alternatively, the biometric authentication process by the high-speed authentication method may be performed on the registrant information 241x including the registrant information 241a and the registrant information 241b, and thereafter the biometric authentication process by the high-compatibility-rate authentication method may be performed on the registrant information 241b.

Meanwhile, if the determined quality value is less than the first threshold value, i.e., if the user is incompatible with the high-speed authentication method (NO at Step S203), the authentication control unit 231 instructs the biometric information input unit 110b to acquire the biometric information for the high-compatibility-rate authentication method (Step S209). Then, the authentication control unit 231 instructs the authentication unit 134b to perform the biometric authentication process by the high-compatibility-rate authentication method on the registrant information 241c (Step S210).

In the second processing procedure, if a user is compatible with the high-speed authentication method, and if sufficiently high-quality biometric information of the user is acquired by the biometric information input unit 110a, the user is authenticated at a high aped and with high accuracy.

Further, if a user is compatible with the high-speed authentication method, but if sufficiently high-quality biometric information of the user is not acquired by the biometric information input unit 110a, the user is authenticated with high accuracy by the combination of the high-speed authentication method and the high-compatibility-rate authentication method. In this case, the authentication by the high-compatibility-rate authentication method is performed on the registrants narrowed down by the high-speed authentication method. Therefore, the user can be authenticated in a sufficiently short time, even if the authentication by the high-compatibility-rate authentication method is low in speed.

Furthermore, if a user is incompatible with the high-speed authentication method, the authentication by the high-compatibility-rate authentication method is performed on the small number of previously grouped registrants. Therefore, the user can be authenticated in a sufficiently short time, even if the authentication by the high-compatibility-rate authentication method is low in speed.

In the above-described processing procedure, if the quality value is equal to or higher than the first threshold value and is equal to or higher than the second threshold value, the biometric authentication process by the high-speed authentication method is performed only on the registrant information 241a. Alternatively, if the number of the registrant information sets is small, or if the authentication process by the employed high-speed authentication method is sufficiently high in speed, the biometric authentication process by the high-speed authentication method may be performed on the registrant information 241x including the registrant information 241a and the registrant information 241b. In this case, the time required for the authentication process is increased. However, there is no possibility of occurrence of an error in which the information of a target user is excluded from the registrant information subjected to the authentication. Accordingly, the ratio at which the target user is rejected is expected to be reduced.

Meanwhile, the configuration of the biometric authentication device 200 according to the present example illustrated in FIG. 6 can be changed in various ways within a scope not deviating from the gist of the present embodiment. For example, if the functions of the control unit 130 of the biometric authentication device 200 are implemented as software and executed on a computer, functions equal to the functions of the biometric authentication device 200 can be realized. The configuration of the computer which executes a biometric authentication program implementing the functions of the control unit 130 as software is similar to the configuration illustrated in FIG. 4.

As described above, in the present second example, if a user is determined to be compatible with the high-speed authentication method but not to be sufficiently accurately authenticated solely by the high-speed authentication method, the authentication of the user is performed by the combination of the high-speed authentication method and the high-compatibility-rate authentication method. Accordingly, the accuracy of the authentication can be improved.

In the respective examples described above, the description has been made of the example in which the biometric information for the authentication by the high-speed authentication method and the biometric information for the authentication by the high-compatibility-rate authentication method are individually acquired. Alternatively, to reduce the load on the user required to acquire the biometric information, and to reduce the time required for the authentication process, biometric information input means capable of simultaneously acquiring the biometric information for the authentication by the high-speed authentication method and the biometric information for the authentication by the high-compatibility-rate authentication method may be employed.

Further, to cope with a change of the biometric information due to a difference in the brightness, the season, or the model of the biometric information input means such as the posture which a user is instructed to take, and a difference in the environment under which the biometric information is acquired, for example, plural sets of biometric information of the same type may be registered for each registrant.

Further, in accordance with the difference of the environment under which the biometric information is acquired, for example, switching may be made between the authentication method employed as the high-speed authentication method and the authentication method employed as the high-compatibility-rate authentication method. Furthermore, to be compatible with the respective authentication methods, a large variety of biometric information may be registered for each registrant.

Further, in the respective examples described above, the description has been made of the example in which the fingerprint authentication is employed as the high-speed authentication method and the vein authentication is employed as the high-compatibility-rate authentication method. Alternatively, iris authentication may be employed, for example, as the high-speed authentication method. Further, face authentication or signature authentication may be employed, for example, as the high-compatibility-rate authentication method. Still alternatively, the fingerprint authentication and the iris authentication may be employed as the high-speed authentication method and the high-compatibility-rate authentication method, respectively.

According to the present embodiment, the registrants compatible with the high-speed authentication method and the registrants incompatible with the high-speed authentication method are previously distinguished from each other and registered. Then, in the authentication process, the quality of the biometric information of a user is determined. If the user is determined to be compatible with the high-speed authentication method, the authentication of the user is performed with the use of the high-speed authentication method. Meanwhile, if the user is determined not to be compatible with the high-speed authentication method, the authentication of the user is performed with the use of the high-compatibility-rate authentication method, which is performed only on the previously distinguished and registered registrants incompatible with the high-speed authentication method. Accordingly, the present embodiment exerts an effect of achieving the high-speed and high-compatibility-rate biometric authentication, even if the user is incompatible with the high-speed authentication method.

Further, according to the present embodiment, if a user is determined to be compatible with the high-speed authentication method but not to be sufficiently accurately authenticated solely by the high-speed authentication method, the authentication of the user is performed by the combination of the high-speed authentication method and the high-compatibility-rate authentication method. Accordingly, the present embodiment exerts an effect of enabling improvement of the accuracy of the authentication.

Further, according to the present embodiment, in the authentication by the combination of the high-speed authentication method and the high-compatibility-rate authentication method, the candidates are narrowed down through the authentication by the high-speed authentication method, and thereafter the authentication by the high-compatibility-rate authentication method is performed on the candidates. Accordingly, the present embodiment exerts an effect of enabling prevention of a reduction in the processing speed while improving the accuracy of the authentication.

Further, according to the present embodiment, the threshold value of the matching degree used in the authentication is changed in accordance with the quality of the biometric information acquired from a user. Accordingly, the accuracy of the authentication and the recognition rate can be optimized.

Further, according to the present embodiment, plural sets of biometric information are registered for each user in association with the environment. Accordingly, the present embodiment exerts an effect of enabling highly accurate biometric authentication irrespective of the change of the environment under which the biometric information is acquired from the user.

Further, according to the present embodiment, plural types of biometric information are registered for each user. Accordingly, the present embodiment exerts an effect of enabling coping with the change of the biometric authentication method.

As described above, the biometric authentication device, the biometric authentication program, and the multi biometrics authentication method according to the present embodiment are effective in the authentication of a user performed with the use of the biometric information, and are particularly suitable for a situation in which the high-speed and high-compatibility-rate biometric authentication needs to be achieved.

What is claimed is:

1. A biometric authentication method comprising:
    storing information corresponding to a plurality of users in association with reference fingerprint image data of each of users and second reference biometric data of the users;
    obtaining fingerprint image data of a user;
    determining an image data quality of the obtained fingerprint image data;
    providing fingerprint authentication by comparison of fingerprint image data with the reference fingerprint image data when the image data quality of the obtained fingerprint image data determined by the determining is not less than a certain threshold level;
    obtaining second biometric data of the user by inputting second biometric information of the user when the image data quality of the first biometric fingerprint image data determined by the determining is less than the certain threshold level;
    providing second biometric authentication by comparison of the obtained second biometric data with the stored second reference biometric data of the users; and
    dividing the users to a first group and a second group based on qualities of the first reference biometric data of the users, qualities of first reference biometric data of users divided to the first group being larger than qualities of first reference biometric data of users divided to the second group;
    wherein the fingerprint authentication is performed at a higher speed than the second biometric authentication.

2. The biometric authentication method according to claim 1, wherein
    the image quality of the fingerprint image data is evaluated by clear of a ridge of the fingerprint image.

3. The biometric authentication method according to claim 1, wherein the biometric authentication is a vein authentication.

4. The biometric authentication method according to claim 1 comprising:
    obtaining first reference biometric data of users for the first biometric authentication;
    obtaining second reference biometric data of the users for the second biometric authentication; and
    obtaining a biometric data of a user,
    wherein the quality of biometric data for the first biometric authentication is a quality of biometric data of the user, the first biometric authentication and the second biometric authentication based on the quality of biometric data of the user being selectively executed,
    wherein the first biometric authentication is executed using the first reference biometric data of the users divided to the first group, and the second biometric authentication is executed using the second reference biometric data of the users divided to the second.

5. The biometric authentication method according to claim 1, wherein the second biometric data includes vein data of the user.

6. A biometric authentication apparatus comprising:
a fingerprint authentication unit that provides authentication by comparison of fingerprint image data with the reference fingerprint image data;
the biometric authentication apparatus characterized by a storing unit that stores information corresponding to a plurality of users in association with reference fingerprint image data of each of users and reference biometric data;
a fingerprint unit that obtain image data of a user;
an image data quality determining unit that determines quality of the obtained fingerprint image data by evaluating a clear condition in a ridge line of the obtained fingerprint image data;
a fingerprint authentication unit that provides fingerprint authentication by comparison of fingerprint image data with the reference fingerprint image data when the image data quality of the obtained fingerprint image data determined by the determining unit is not less than a predetermined level;
a biometric data unit that obtains biometric data of the user by inputting second biometric information of the user when the image data quality of the fingerprint image data determined by the determining is less than the predetermined level;
a second authentication unit that provides biometric authentication by comparison of the obtained biometric data with the stored reference biometric data of the users; and
a dividing unit that divides the users to a first group and a second group based on qualities of the first reference biometric data of the users, qualities of first reference biometric data of users divided to the first group being larger than qualities of first reference biometric data of users divided to the second group;
wherein the fingerprint authentication is performed at a higher speed than the second biometric authentication.

7. The biometric authentication apparatus according to claim 6, wherein
the image quality of the fingerprint image data is evaluated by clear of a ridge of the fingerprint image.

8. The biometric authentication apparatus according to claim 6, wherein the biometric authentication provided by the second authentication unit is a vein authentication.

9. A non-transitory computer-readable recording medium that stores a computer program for controlling an apparatus according to a process comprising:
providing fingerprint authentication by comparison of fingerprint image data with the reference fingerprint image data;
the process characterized by
storing information corresponding to a plurality of users in association with reference fingerprint image data of each of users and reference biometric data;
obtaining fingerprint image data of a user;
determining an image data quality of the obtained fingerprint image data by evaluating a clear condition in a ridge line of the obtained fingerprint image data;
providing fingerprint authentication by comparison of fingerprint image data with the reference fingerprint image data when the image data quality of the obtained fingerprint image data determined by the determining is not less than a predetermined level;
obtaining biometric data of the user by inputting biometric information of the user when the image data quality of the fingerprint image data determined by the determining is less than the predetermined level;
providing biometric authentication by comparison of the obtained biometric data with the stored reference biometric data of the users; and
dividing the users to a first group and a second group based on qualities of the first reference biometric data of the users, qualities of first reference biometric data of users divided to the first group being larger than qualities of first reference biometric data of users divided to the second group;
wherein the fingerprint authentication is performed at a higher speed than the second biometric authentication.

10. The non-transitory computer-readable recording medium according to claim 9, wherein
the image quality of the fingerprint image data is evaluated by clear of a ridge of the fingerprint image.

11. The non-transitory computer-readable recording medium according to claim 9, wherein the biometric authentication is a vein authentication.

* * * * *